(12) United States Patent
Jernigan

(10) Patent No.: US 7,712,726 B1
(45) Date of Patent: May 11, 2010

(54) MACHINE FOR PULLING WIRE THROUGH A CONDUIT

(76) Inventor: Scott Alan Jernigan, 7001 Highway 25, Cross Plains, TN (US) 37049

( * ) Notice: Subject to any disclaimer, the term of this patent is extended or adjusted under 35 U.S.C. 154(b) by 0 days.

(21) Appl. No.: 11/595,532

(22) Filed: Nov. 10, 2006

(51) Int. Cl.
*H02G 1/08* (2006.01)
*E21C 29/16* (2006.01)

(52) U.S. Cl. .................. 254/134.3 FT; 254/134.3 R

(58) Field of Classification Search ........ 254/134.3 FT, 254/134.3 R, 134.3 PA, 134.4 FT
See application file for complete search history.

(56) References Cited

U.S. PATENT DOCUMENTS

| | | | |
|---|---|---|---|
| 3,514,048 A | 5/1970 | Lowery | |
| 3,952,999 A | 4/1976 | Keller et al. | |
| 3,968,952 A * | 7/1976 | Newell | .................. 254/134.3 R |
| 4,033,551 A | 7/1977 | Lindstrom | |
| 4,270,734 A | 6/1981 | Straight | |
| 4,337,924 A | 7/1982 | Gebo | |
| 4,456,225 A | 6/1984 | Lucas | |
| 4,635,875 A | 1/1987 | Apple | |
| 5,984,273 A | 11/1999 | Ray | |
| 6,286,815 B1 | 9/2001 | Ray | |
| 6,367,778 B1 | 4/2002 | Mobley et al. | |
| 6,540,208 B1 | 4/2003 | Pecot et al. | |
| 6,682,250 B2 | 1/2004 | Banks | |
| 6,691,985 B1 | 2/2004 | El Haddad | |
| 6,769,669 B2 * | 8/2004 | Cook et al. | .................. 254/329 |
| 6,883,783 B1 | 4/2005 | Quittschreiber | |
| 2002/0100898 A1 | 8/2002 | Knoerzer et al. | |
| 2003/0098450 A1 | 5/2003 | Cook et al. | |

* cited by examiner

*Primary Examiner*—Hadi Shakeri
(74) *Attorney, Agent, or Firm*—David D. Winters

(57) ABSTRACT

A device for pulling wire through a conduit with sheave head, sheave head support boom, wire puller frame, conduit interface, and wire pull assembly. The wire pull assembly further comprises a capstan, a gear box having an input axle and an output axle, and a means to interface a power source to impart rotating force to the capstan.

2 Claims, 6 Drawing Sheets

MACHINE FOR PULLING WIRE THROUGH A CONDUIT

CROSS REFERENCE TO RELATED APPLICATIONS

Not Applicable

STATEMENT REGARDING FEDERALLY SPONSORED RESEARCH OR DEVELOPMENT

Not Applicable

DESCRIPTION OF ATTACHED APPENDIX

Not Applicable

BACKGROUND OF THE INVENTION

This invention relates generally to the field of wire movement and more specifically to a machine for pulling wire through a conduit.

The simple act of pulling wire through conduit is an art of continuously growing importance as on-the job muscle strain and long term back injury become increasingly common in installation of new communications and power systems. Generally speaking, a new building or structure must be internally wired and that internal wiring then interfaced with an external power or communications grid. For electrical power systems, the interface point is usually an electric meter box, affixed to the exterior of the building. The incoming wires of the power grid are frequently supported by utility poles placed along a road or thoroughfare proximate the building.

Until recently, the preferred means to affect such interface has been to string the wires from utility pole to house, the wires suspended in space between the two. However, this practice is falling out of favor for numerous reasons of esthetics, obstruction, and practicality.

Wires are increasingly being run underground, particularly from utility poles to meter boxes by means of conduits. The wires remain, thus, out of sight and out of the reach of deleterious environmental conditions. The preferred configuration of the conduits is an essentially vertical extension downward to a point below the ground of sufficient depth to afford protection from previously mentioned environmental elements and thence via a substantially horizontal conduit to a point substantially below desired location, such as a meter box, and then up a substantially vertical conduit extension to the meter box location.

This gives occasion to the necessity of pulling wires through the conduit after it is placed. Because the wires are very heavy, there is significant friction between the wires and the interior of the conduit, especially at the points of transition from substantially vertical to substantially horizontal courses and vice versa. Pulling these wires through up to several hundred feet of conduit, is a very laborious and dangerous task which may require the exertion of several strong men, as presently accomplished. It is back-breaking work, and often literally results in muscle strains and injuries. Thus, a machine that is light and can easily be transported to a remote site by one person and that can facilitate the wire pulling task without this expensive, unpleasant, slow, and potentially dangerous human effort is desirable. Accordingly, a number of inventors have addressed this issue as discussed below. The instant art is an advancement over such extant technology.

U.S. Pat. No. 6,540,208 B1 by Pecot et al., discloses a method of installing cable in a conduit wherein the cable is borne through the conduit by a flow of pressurized water, the pressure and flow rate of which is carefully regulated by a complex arrangement of various elements, the whole being controlled by a central processing unit.

In substantial contrast to Pecot et al., the instant art teaches neither pressurized water nor arrangement of complex elements to direct pressurized water, nor any sort of microprocessor.

U.S. Patent Application 2002/0100898 A1 by Knoerzer et al. teaches an articulated cable puller having a boom adjustable for horizontal and vertical orientations, a rotatable base, and hydraulic cylinders to affect the articulation. The Knoerzer et al. art, is large, heavy, and must be mounted on a large vehicle.

In contrast to Knoerzer et al., the instant art employs no booms having inter-planar movement, no rotating bases, and no hydraulic cylinders. Furthermore, and in further contrast, the instant art is small, light, and easily carried by one person. In yet additional contrast to Knoerzer et al., the instant art is significantly less complex.

U.S. Patent Application 2003/0098450 A1 by Cook et al. recites a cable pulling device comprising power means (electrical), protractors to pivotably mount a frame member, a base to support the device on and against the ground, foot control means to activate or deactivate the device, a plurality of pulleys, and an articulatable bushing assembly.

In substantial contrast to Cook et al., the instant art requires no pivotable elements, no component that must be supported by or in contact with the ground, no plurality of pulleys, no foot controls and no articulating components. Furthermore, the instant art is not limited to using electrical power, but on the contrary teaches embodiments having non-electrical power means using, in fact, virtually any rotary power source that can physically fit the device. In addition, the instant art comprises fewer parts so is more easily and economically fabricated and assembled.

U.S. Pat. No. 3,514,048 by Lowery teaches a cable feed apparatus. In substantial contrast to the instant disclosure, Lowery recites a fairlead that guides a cable but does not impart motive force to a cable. The instant technology imparts pulling force at a capstan.

U.S. Pat. No. 3,952,999 by Keller et al. discloses a wire pulling apparatus having a base that must rest upon a floor, having wedges to anchor the base to a wall, and having a plurality of upright members having an axle journaled there between. In addition, Keller et al., teaches a pulley having a sheave too small to allow a cable to be set by multiple turns around it. Motive force is provided by means of human muscle.

In substantial contrast to Keller et al., the instant art teaches no base that must be supported by a floor, no means to anchor the base to a wall, and no plurality of upstanding members. In additional contrast to Keller et al., the instant art recites an energy imparting capstan having a sheave such that a line or cable may be wound around it a plurality of times and thus achieve a set. In yet further contrast to Keller et al., the instant art teaches away from using human muscle as a motive force.

U.S. Pat. No. 4,270,734 by Straight teaches an automatic wire puller having a frame with opposed sides adapted to fit between support studs, and a winch having a drum to receive and store line. In addition, the frame is contrived with sets of brackets so that the drawing force of the winch will create force against the brackets causing them to clamp against the studs. The distance over which a line may be pulled by the Straight art is limited to the capacity of the drum, thus the pulling force will decrease as the drum fills.

In contrast to Straight, the instant art teaches no frame having opposing sides that must be supported by spaced apart studs, nor any bracket arrangement requiring a plurality of brackets arranged so that a clamping force moment will be created by the turning of the winch. In addition, the instant art teaches a capstan rather than a storage drum so that the distance it may pull a line is not limited to the capacity of a drum. Also, because the capstan does not store line, the pulling force of the capstan will remain constant as increasing amounts of line are pulled in additional contrast to Straight.

U.S. Pat. No. 4,033,551 by Lindstrom teaches a wire pulling device having a portion that must be supported by a wall and another portion that must be supported by the ground. In contrast to Lindstrom, the instant art requires no support by either a wall or the ground or a floor.

U.S. Pat. No. 4,337,924 by Gebo recites a wire pulling device having a pair of stanchions joined by a cross brace, a pair of capstans, a pair of motors, a plurality of pulleys, and a pair of pull ropes. In addition, Gebo discloses a base which must be supported by the ground or a floor.

In substantial contrast to Gebo, the instant art teaches no stanchions joined by a cross brace, no plurality of pulleys, no plurality of capstans, no plurality of motors, and no plurality of pull ropes. Furthermore, the instant art is not limited to support by the ground or a floor. In further contrast to Gebo, the instant art is much less complex than Gebo and accordingly can be fabricated and assembled much more cheaply and easily than Gebo.

U.S. Pat. No. 4,635,875 by Apple discloses a line pulling device comprising a pulling element having a drum with storage means, bull wheels over which a line must be looped in "figure 8" configuration, and an oscillatory sheave. Furthermore, Apple teaches complicated arrangements to synchronize the rotating speed of a plurality of wheels and equally complex means to equalize pulling force of the wheels and hydraulic circuits.

In substantial contrast to Apple, the instant art teaches no plurality of bull wheels, no storage drum, no hydraulic circuits, no oscillating elements, no lines looped in "figure 8" configuration, and no pulling force or wheel speed synchronization means.

U.S. Pat. No. 6,691,985 B1 by El Haddad teaches an electrical wire pulling apparatus supported by brackets for attaching it to the walls of a pre-existing housing.

In contrast to El Haddad, the instant art teaches no brackets for attachment force creating means and is not limited to attachment to a pre-existing structure having walls.

U.S. Pat. No. 6,883,783 B1 by Quittschreiber teaches a machine for pulling wire through an underground conduit, the machine requiring pre-installed anchor bolts and a universal adapter plate having slots disposed to receive a plurality of patterns of anchor bolts. In contrast to Quittschreiber, the instant art teaches no universal adapter plate and is not limited to use in locations having pre-installed anchor bolts.

U.S. Pat. No. 6,367,778 B1 by Mobley et al. teaches a line pulling device having a plurality of rollers that pinch a line between them to impart pulling force to the line, the position of the rollers being adjustable to accommodate different diameters of lines, and a yoke to support the rollers. In addition, Mobley teaches communication of the rollers by means of interconnecting gears.

In contrast to Mobley, the instant art teaches no plurality of rollers to impart pulling force to a line and teaches away from pinching a line between rollers to impart pulling force to a line, but, rather teaches a capstan. In additional contrast to Mobley, the instant art teaches no adjustable rollers to accommodate different diameters of lines, no yoke to support rollers, and no rollers communicating by means of interconnected gears.

U.S. Pat. No. 5,984,273 and U.S. Pat. No. 6,286,815, both by Ray, teach wire pullers having a pivoting frame, the frame also having an "on/off" switch, a stand supported by the ground, and a drive shaft mounted by one device on a particular area of the frame, and mounting of a power device by means of another device on another area of the frame.

In contrast to both Ray patents, the instant art teaches no pivotable elements, and requires no "on/off" switch, no stand that must be supported by the ground or a floor, and no driveshaft mounted on one part of the frame and power source mounted on another part of the frame. It uses, rather, a drive shaft and power source mounted on the frame by means of one device at one location.

U.S. Pat. No. 6,286,815 B1 by Ray recites a wire puller having a frame, the frame also having a particular forearm portion, supported by a base that must be supported by the ground or a floor, a drive shaft mounted on a particular portion of the frame by another device, a power source mounted on another portion of the frame by means of another separate device, and a mounting bracket attached to the forearm portion wherein the mounting bracket further supports a means to interface with the opening of a conduit, but wherein, during operation of the device, the interface means does not bear the weight of the device or the moment force created by the pulling force and the resistance of the line.

In substantial contrast to Ray, the instant art teaches no component that must be supported by the ground or the floor, no separate portions of the frame for mounting a drive shaft and a power source, and no separate devices for mounting a drive shaft and a power source. In further contrast to Ray, the instant art teaches a mounting bracket not attached to a forearm portion, but supporting a device to interface with the opening of a conduit, the opening supporting the weight of the entire device and the moment of pulling force of the power source and resistance, in yet further contrast to Ray.

U.S. Pat. No. 4,456,225 by Lucas teaches a cable-pulling apparatus, comprising a plurality of pulleys, a plurality of yokes, a frame portion that must be supported by the ground or a floor, and means to transfer a portion of the weight of the device, the moment of force created by the pulling force, and resistance of the cable being pulled, to the lip of a conduit and/or a surface of a structure such as a junction box. Furthermore, the means to transfer the previously described moment of force to the lip of the conduit is by means of plates disposed at an angle such that points of contact between the plates and the conduit are small and constitute a very small portion of the conduit lip.

In substantial contrast to Lucas, the instant art teaches no plurality of pulleys, no plurality of yokes, nor any element that must be supported by the ground or a floor. In further contrast to Lucas, the instant art teaches force transfer to the lip of a conduit by means of an annular device that contacts substantially the entire surface of the lip of the conduit. In yet additional contrast to Lucas, the instant disclosure recites transfer of all weight of the device and all wire pulling forces to the lip of the conduit, not just a part of the forces as in Lucas.

U.S. Pat. No. 3,968,952 by Newell teaches a line pulling device having a frame with a plurality of separate sections pivotably connected in relation to each other, and horizontal support elements that support operative elements of the device.

In contrast to Newell, the instant art comprises no pivotable elements, but a frame comprising only one element, and requires no horizontal support components to support any operative parts of the instant technology.

BRIEF SUMMARY OF THE INVENTION

The primary object of the invention is to reduce physical human labor from the process of pulling wire through a conduit.

Another object of the invention is to provide a cable-pulling machine that is light in weight and easily transportable to a remote job site by a worker.

Another object of this invention is to provide a cable-pulling machine that is compatible with already-available sources of mechanical power.

Another object of the invention is to provide a cable-pulling machine that is simple and economical to manufacture.

Other objects and advantages of the present invention will become apparent from the following descriptions, taken in connection with the accompanying drawings, wherein, by way of illustration and example, an embodiment of the present invention is disclosed.

In accordance with a preferred embodiment of the invention, there is disclosed a machine for pulling wire through a conduit comprising: sheave head, sheave head support boom, wire puller frame, conduit interface, and wire pull assembly and mechanical power drive source interface.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

LIST OF COMPONENTS

Figure 1:
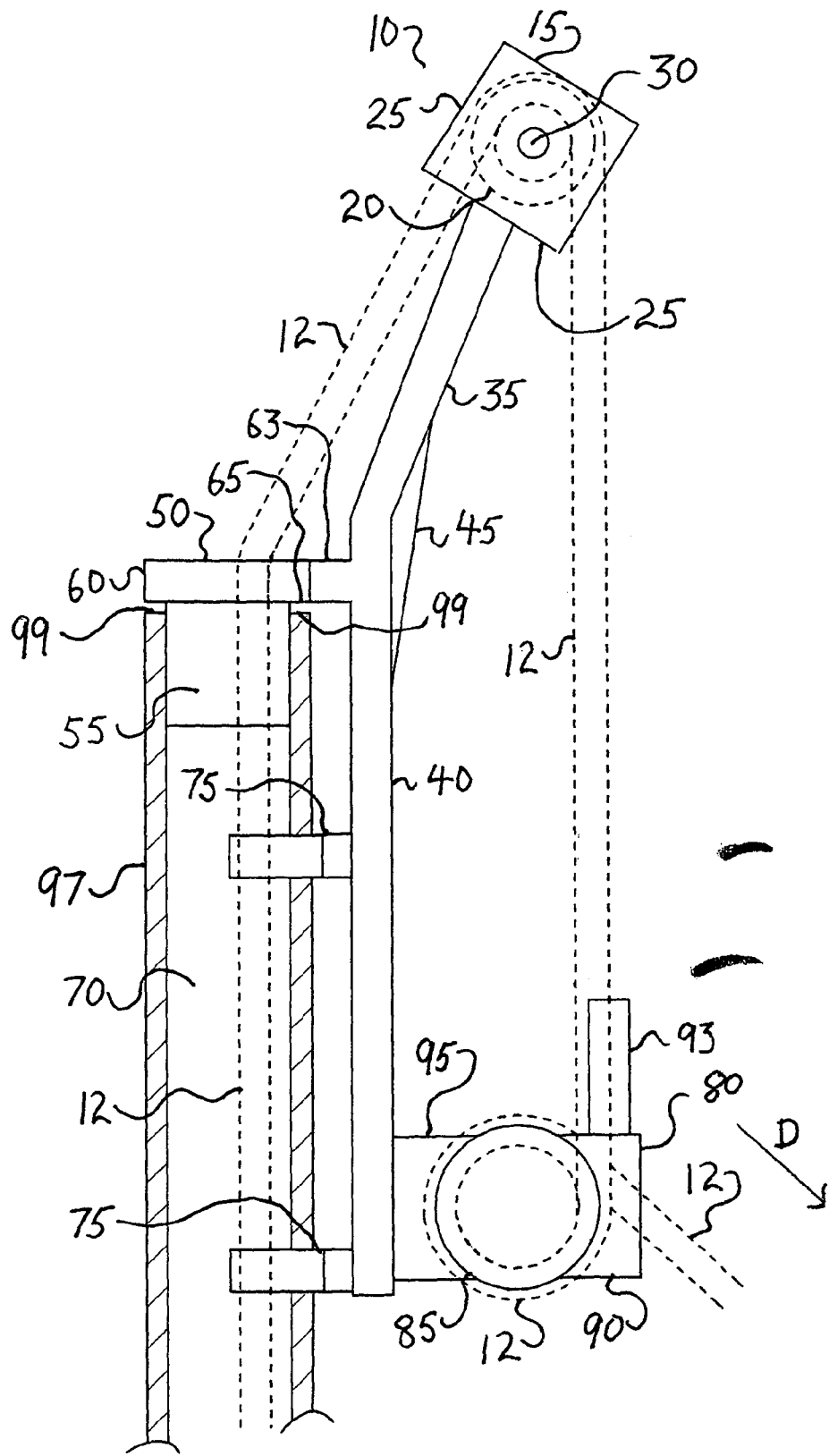
FIG. 1 is a side perspective view of the device.

10 Device
12 Line
15 Sheave head
20 Sheave
22 Mid-points
25 Sheave housing
30 Sheave axle
35 Sheave head support boom
40 Puller frame
42 Puller frame male section
45 Sheave head support boom brace
48 Puller frame female section
50 Conduit interface
52 Conduit interface male section
55 Conduit interface spud
58 Conduit interface female section
60 Conduit interface boss
63 Conduit interface bracket
65 Conduit interface shoulder
70 Wire passage
75 Non-tension support bracket
80 Wire pull assembly
83 Capstan axle
85 Capstan
90 Gear box
93 Drive interface means
95 Support flange
97 Conduit
99 Conduit lip
102 Fair lead
104 Pin
106 Substantially coaxial hole
110 U-section
113 Slot
D Direction of pull

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Looking now at FIG. 1, we see a conduit (97), shown in cut-away, having a lip (99) and a wire passage (70) extending substantially vertically. We understand that this conduit (97), and more particularly the lip, (99) is a terminus of a possibly underground, substantially horizontal conduit section, comprised by the conduit (97), running to an origin (not shown) that may be hundreds of feet away from the terminus. Furthermore, we recognize that in order to pull a heavy cable through the conduit (97) from the origin to the terminus, a multi-step process is used wherein a very light line is extended through the conduit (97), usually by blowing it from origin to terminus with compressed air, then an end of the very light line at the origin is attached to a heavier line (12), commonly a ⅜ inch nylon line, and this heavier line (12) is pulled from the origin to the terminus by human effort, which is not strenuous and is easily accomplished in a short time. Then, the heavier line (12) is attached, at the origin to the cable to be pulled through the conduit (97). At this point, the instant art is exploited to pull the heavier line (12) through the conduit section thus dragging the very heavy cable, a procedure requiring such energy that it should be most expeditiously done by a machine.

Looking now at FIG. 1, FIG. 1C, FIG. 2, and FIG. 3, we see a line pulling device (10) having a sheave head (15), sheave head support boom (35), puller frame (40), wire pull assembly (80), and conduit interface (50). In addition we see that the sheave head (15) comprises an axle (30) supported by a sheave housing (25) and that the axle (30) supports a sheave (20). We understand that the axle (30) may or may not be journaled. Furthermore, we see that extending from the puller frame (40) at an obtuse angle is a sheave head support boom (35) communicating with the sheave head (15), and that the boom (35) and the puller frame (40) are augmented by a sheave head support boom brace (45).

Looking further at FIG. 1, FIG. 1C, FIG. 2, and FIG. 3, we note that the wire pull assembly (80) has a support flange (95) which is attached to the puller frame (40) and which supports a gear box (90) which has a capstan axle (83) (or gear box output axle) extending therefrom and supporting a capstan (85). Also, we see that communicating with the gear box (90) is a drive interface means (93) whereby the input axle (not shown) of the gearbox (90) communicates with a power source (not shown) which rotates the input axle and ultimately causes the capstan axle (83) to rotate. We understand that there are many such interfaces well known in the art that may be suitably employed. Furthermore, we understand that there are many power sources well known in the art that may be used, and that since the device (10) may be required at remote locations, a power source having an easily portable source of energy, such as liquid or gaseous fuel or an electric battery, is desirable. Furthermore, we see that the mid-points (22) of the capstan (85) and the sheave (20) are substantially co-linear on a vertical.

Turning yet again to FIG. 1, FIG. 1C, FIG. 2, and FIG. 3, we see that the conduit interface (50) has a wire passage (70), is attached to the puller frame (40) on the side opposite the wire pull assembly (80), and comprises a conduit interface spud (55) having a conduit interface spud boss (60), so disposed in relationship with the spud (55) so as to comprise a conduit interface shoulder (65). In addition we note that the elements of the conduit interface (50) are substantially annular and that the conduit interface (50) is attached to the puller frame (40) by means of a conduit interface bracket (63). We also see that the conduit interface spud (55) has a diameter slightly less than the diameter of the conduit (97) so that the spud (55) may be inserted into the conduit (97) such that the conduit interface shoulder (65) will rest upon and be supported by the conduit lip (99).

Figure 4:
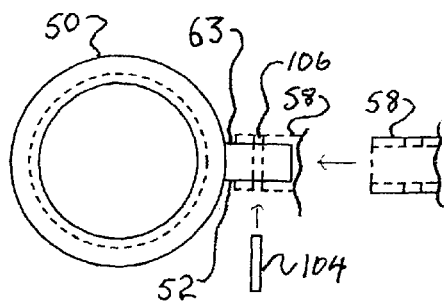
FIG. 4 is a perspective view of a component of the device.

Furthermore, we understand that because conduits of different sizes may be used for different constructions, the conduit interface (50) may be interchangeable by any of a variety of means well known in the art. In example, as in FIG. 4 where we see a conduit interface (50) having a conduit interface bracket (63) comprising a male section (52) attached to the conduit interface (50) and a female section (58) attached to the puller frame (40) (not shown in FIG. 4), said sections (52 and 58) having substantially co-axial transverse holes (106). Thus, when the male section (52) is inserted into the female section (58), the holes (106) may align so that a removable and insertable pin (104) may be inserted therethrough to hold the sections (52 and 58) together. Alternatively, the pin (104) may be removed and the sections (52 and 58) may be separated. Thus, the male and female sections (52 and 58) may disconnectably communicate allowing different diameter conduit interfaces (50) having identical male bracket sections (52) to be removably connected to the same female bracket section (58) permitting a variety of conduit interfaces (50) to be used with the same wire pulling device (10).

Figure 5:
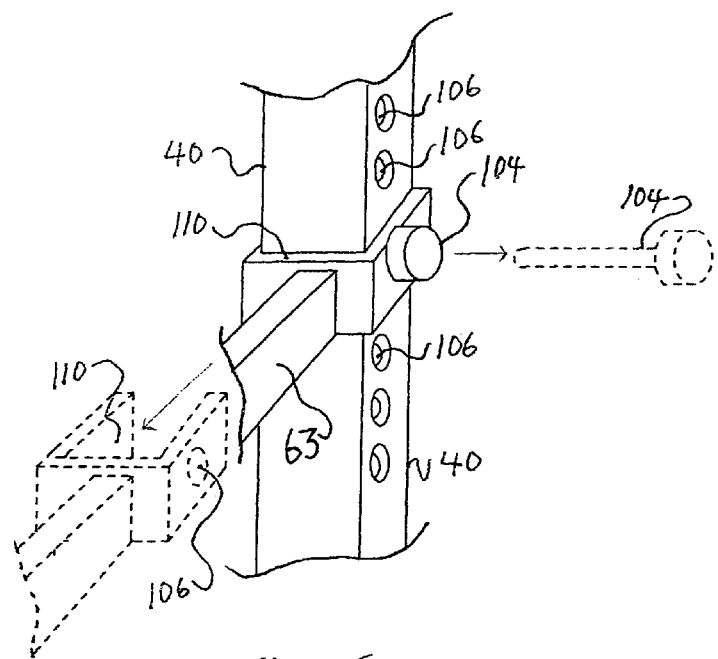
FIG. 5 is a perspective view of components of the device.

Because different conduits may or may not have associated with them various types of meter boxes, junction boxes or other structures, the position on the puller frame (40) of the conduit interface (50) may be variable by any of sundry means well known in the art so that the device (10) may be configured to communicate with the conduit (97). In example as in FIG. 5 where we see that the puller frame (40) comprises a plurality of substantially coaxial transverse holes (106) and that the conduit interface bracket (63) comprises a U-section (110) having a plurality of substantially coaxial transverse holes (106). Also, we see that the U-section (110) is contrived so that the puller frame (40) will fit therein and so that the substantially coaxial holes (106) in the puller frame (40) may be aligned with the substantially coaxial holes (106) in the U-section (110) thus allowing a removable and insertable pin (104) to be inserted through both the puller frame (40) and the U-section (110) to hold the two together. By varying the holes (106) in the puller frame (40) aligned with the holes (106) in the U-section (110), the position of the conduit interface bracket (63) relative to the puller frame (40) may be adjusted.

Figure 6:
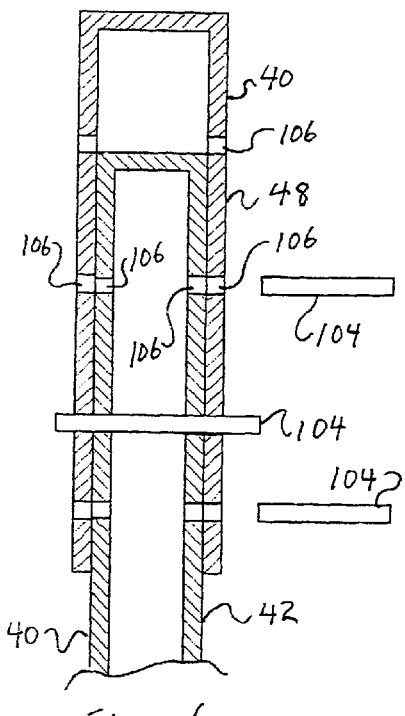
FIG. 6 is a perspective view of a component of the device.

In addition, we understand that the length of the puller frame (40) and/or the length of the sheave head support boom (35) may be adjusted by several means well known in the art. In example as in FIG. 6 where we see a puller frame (40) having a male section (42) and a female section (48) both comprising a plurality of substantially coaxial transverse holes. Further, we also note that the male and female sections (42 and 48) and the substantially coaxial transverse holes (106) are contrived such that when the male puller frame section (42) is inserted into the female puller frame section (48), holes (106) may be aligned so that a removable and insertable pin (104) may be inserted there through thusly holding the two sections (42 and 48) together. Now we may understand that by removing the pin (104) different holes (106) may be aligned and the pin (104) inserted there through. Thus, the length of the puller frame (40) may be adjusted. In the same manner, the sheave head support boom (35) (not shown) may also be contrived to be adjustable.

Looking still further at FIG. 1, FIG. 1C, FIG. 2, and FIG. 3, we see that the puller frame (40) also comprises non-tension support brackets (75) and that the brackets (75) have a semi-annular shape with their inner surfaces substantially conforming to the outer surface of the conduit (97). In addition, we see that the brackets (75) are disposed substantially concentrically with and below the conduit interface (50). Thus, we understand that when the conduit interface spud (55) is inserted into the conduit (97) with the conduit interface shoulder (65) resting upon the conduit lip (99), the non-tension support brackets (75) may rest against the conduit (97) and thus prevent twisting forces upon the conduit (97) by the device (10) during periods when no pulling force is applied by the device (10). In addition, we may readily appreciate that the non-tension support brackets may be made interchangeable and/or adjustable in orientation to the puller frame (40) in the same manner that the conduit interface (50) may be made interchangeable and/or adjustable in orientation to the puller frame (40).

Looking still again at FIG. 1, FIG. 1C, FIG. 2, and FIG. 3, we see that to use the device (10) an end of the line (12) previously threaded through the conduit (97), as previously described, is threaded through the conduit interface (50) and the conduit interface spud (55) is inserted into the conduit (97) so that the device (10) is supported by the conduit lip (99) and the non-tension support brackets (75).

Figure 1A:
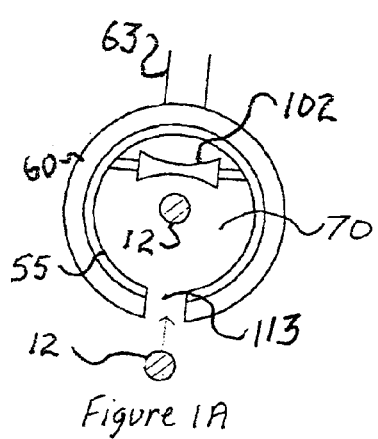
FIG. 1A is a top perspective of an alternate component of the device.

Alternatively, as shown in FIG. 1A, we see that the conduit interface (50) may comprise a slot (113), running substantially vertically through the conduit interface spud (55), conduit interface shoulder (65), and the conduit interface boss (60) so that the line (12) may be passed therethrough into the wire passage (70) rather than be threaded through the conduit interface (50) as previously described. In addition, we see that the conduit interface (50) may comprise a fair lead (102), or other configuration, to guide and/or facilitate the passage of the line (12) through the conduit interface (50).

Figure 1B:
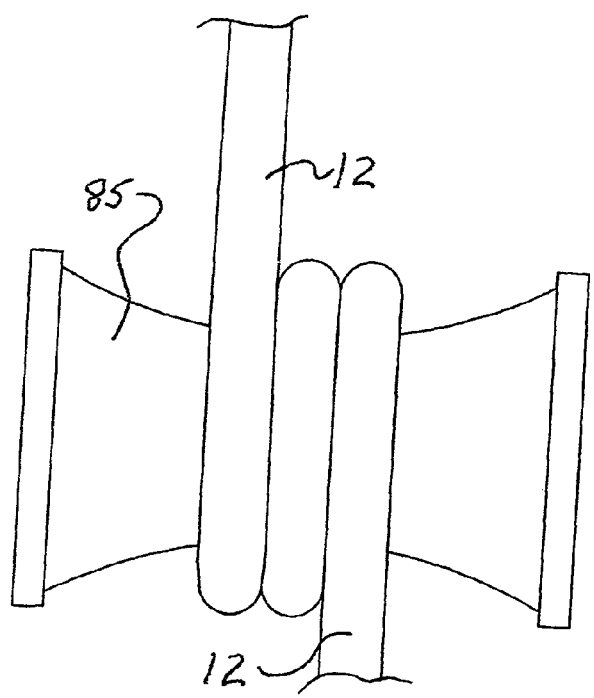
FIG. 1B is a view of a component of the device engaged with a line.
Figure 1C:
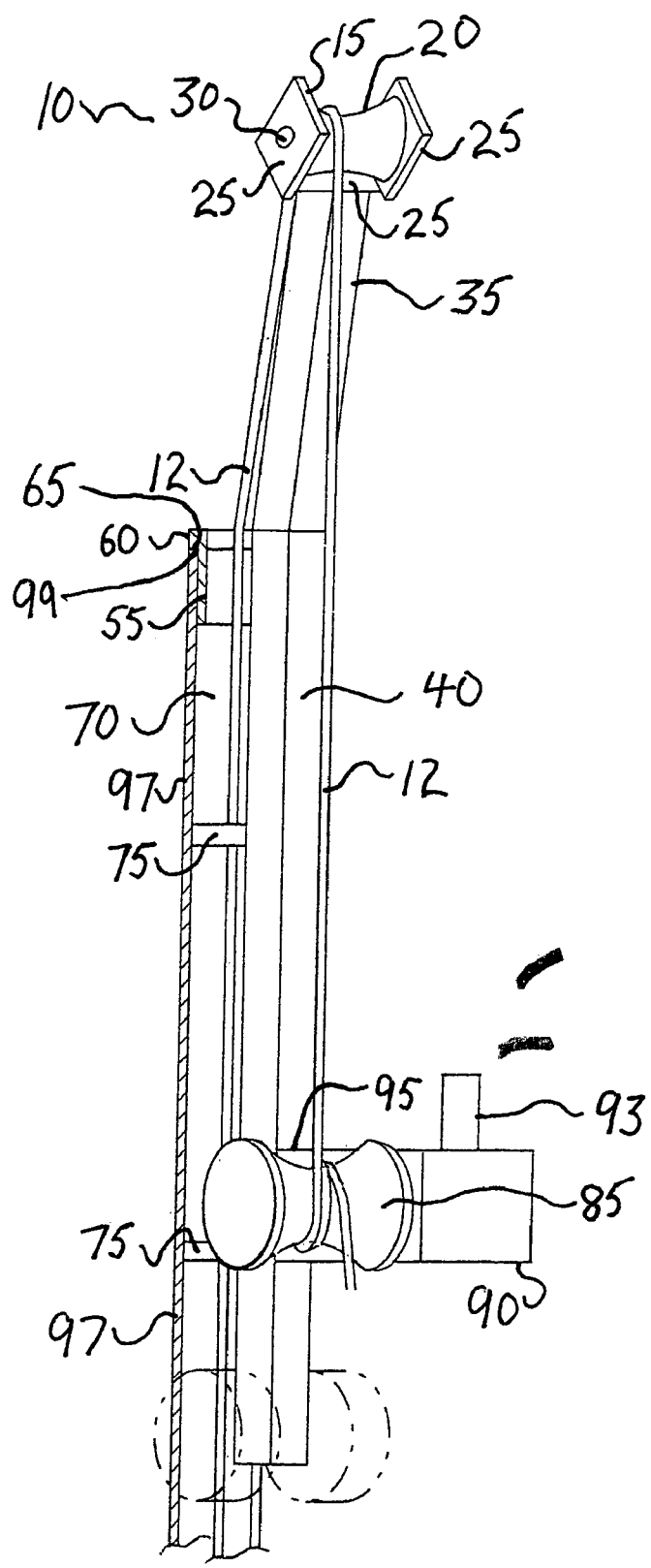
FIG. 1C is a ¾ view of the device in operation.
Figure 2:
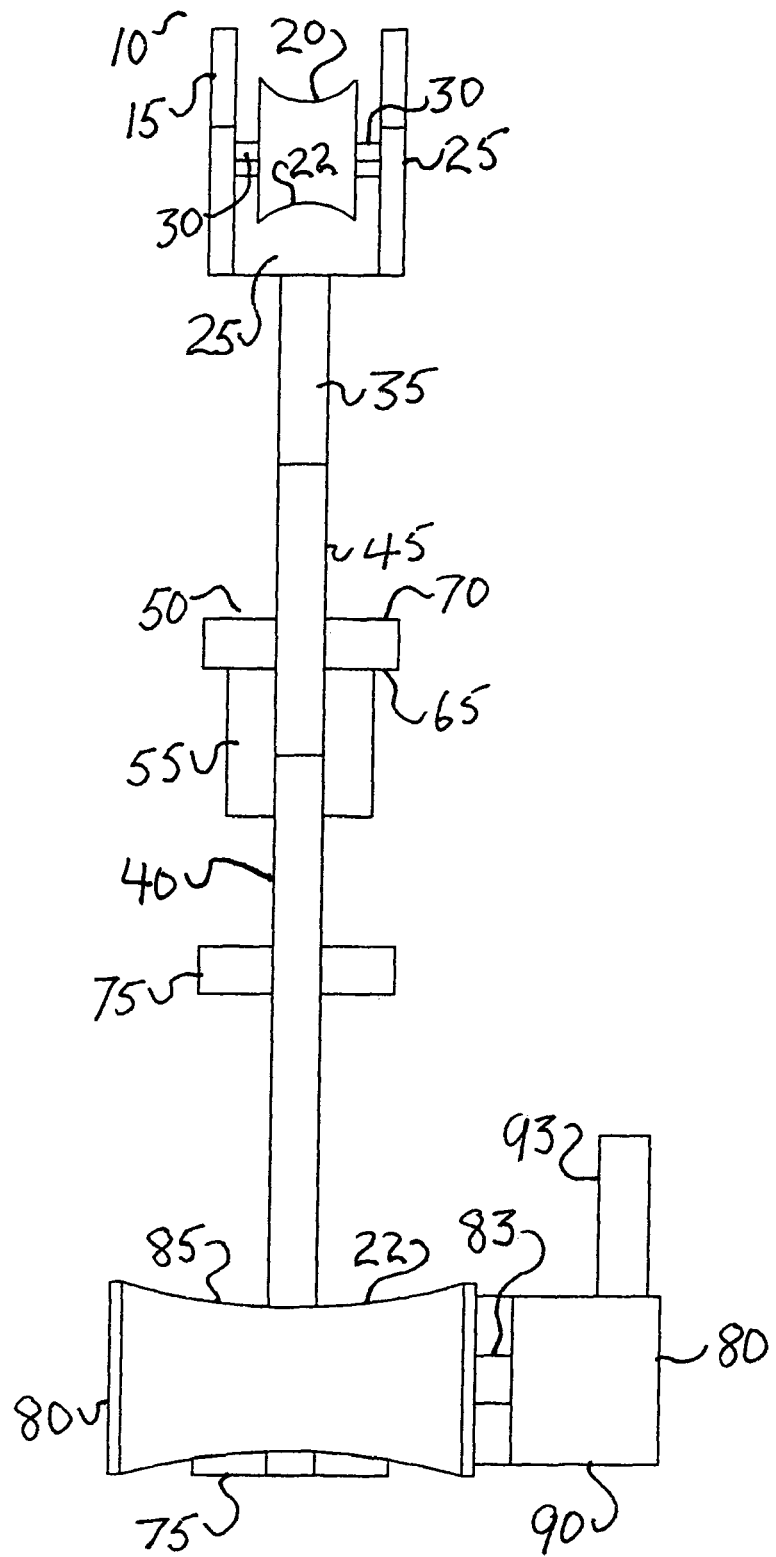
FIG. 2 is a front perspective view of the device.
Figure 3:
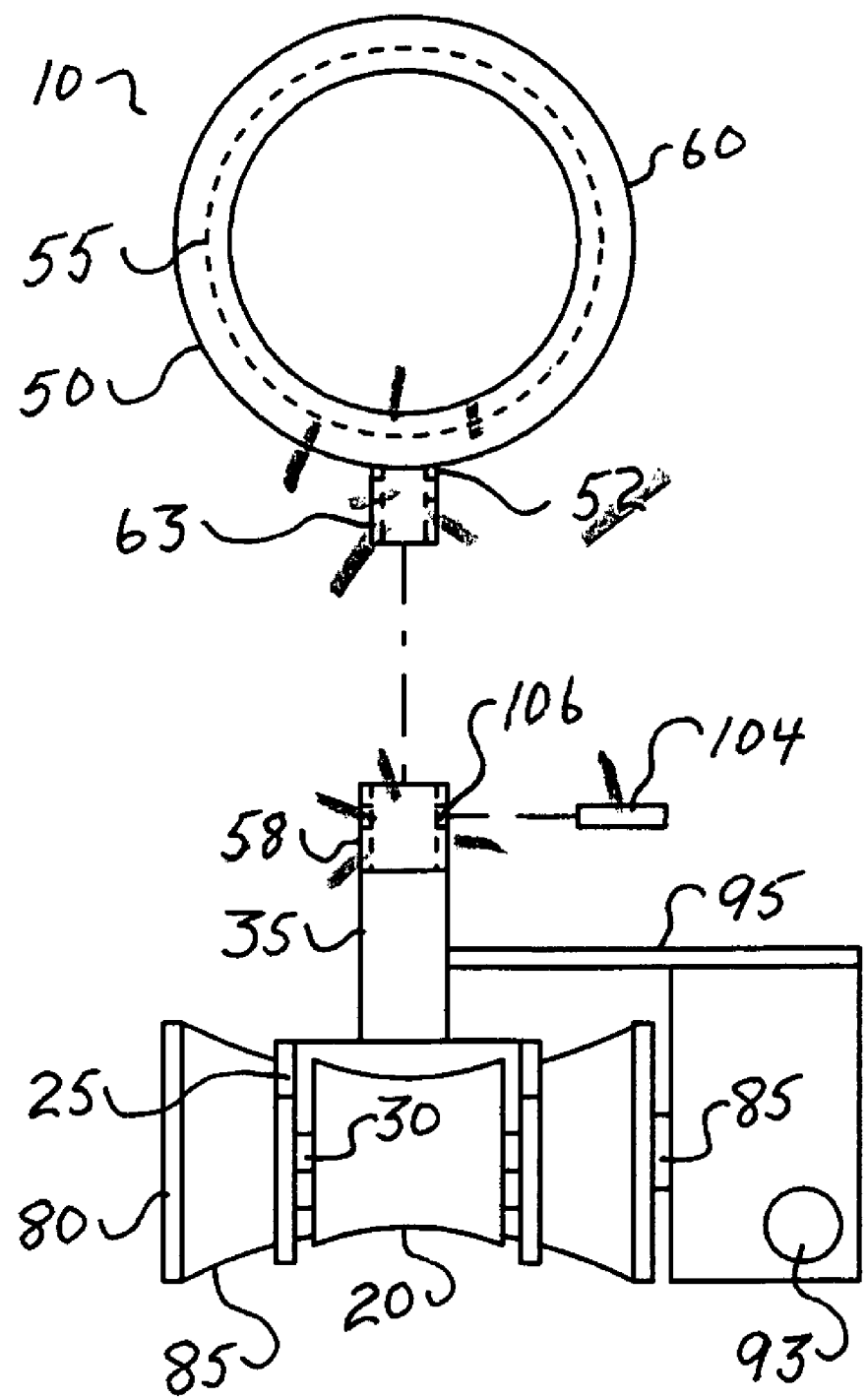
FIG. 3 is a top perspective view of the device.

Then, referring to FIG. 1B and FIG. 1, the line (12) is pulled over the sheave (20) and wrapped a plurality of times, commonly 3, around the capstan (85) with a portion of the line (12) extending so that it may be grasped by an operator. A power source (not shown) is then engaged so that the capstan (85) is caused to turn whereupon the operator applies light tension to the extension of line (12) causing the loops of line (12) around the capstan (85) to bind thus pulling line (12) (in direction D) out of the conduit (97) and the heavy cable attached to the other end of the line (12) through the conduit (97). We understand that the pulling may be interrupted either by disengaging the power source or by releasing tension from the loops wrapped around the capstan (85.)

Those skilled in the art of force vector analysis will readily appreciate that when pulling force is engaged, the moment of force created by the pulling force and the resistance created by the heavy wire being pulled will be concentrated upon the conduit lip (99) and the conduit interface shoulder (65) so that there is very little moment of force between the conduit (97) and the non-tension support brackets (75). Furthermore, we understand that there are many safety devices well known in the art and required by law and/or prudence that may be incorporated into the device (10) without altering its fundamental structure or operating principles.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A wire-pulling machine comprising:
   a puller frame having
      a length, with one or more intermediate points
      a width,
      a top end,
      a bottom end,
      a longitudinal axis, and
   a sheave head support boom, having
      a length,
      a width,
      a top end,
      a bottom end, and
      a longitudinal axis,
   said sheave head support boom bottom end rigidly affixed to the said top end of the said puller frame, such that
   the said longitudinal axis of the said sheave support boom essentially shares a plane with the longitudinal axis of the said puller frame,
   said sheave head support boom also comprised of a sheave-head, comprising,
      a sheave housing, and
      a rotating sheave over which a wire or line to be pulled may be fair-led,
      said rotating sheave mounted in the said sheave housing and having a plane of rotation,
      said sheave head rigidly mounted at the said top end of the said sheave head support boom such that the said plane of rotation of the said rotating sheave is substantially aligned with the said longitudinal axis of the said sheave head support boom,
   said puller frame also comprising
      a wire pull assembly comprised of
         a drive train, comprising,
            a capstan around which a wire or line to be pulled may be wound and fair-led,
            said capstan having a plane of rotation, said plane of rotation being substantially parallel to or co-planer with, the said longitudinal axis of the said puller-frame,
            said capstan so configured that it can turn freely with wire, line, cord, cable or rope wrapped loosely around it, not under tension,
         said drive train also comprising a gearbox,
            said gearbox in drive-train communication with said capstan, said drive train also comprising a drive interface mechanism,
            said drive interface mechanism being connectable to a rotary power source such that said rotary power source may drive rotation of the said gearbox and thereby drive rotation of the said capstan,
   said puller frame also comprised of
      a conduit interface comprising
         a conduit interface boss so configured as to be affixable to an end of a conduit,
      said conduit interface rigidly affixed to the said sheave head support boom at the said top end of the sheave head support boom,
   said puller frame also comprising
      one or more support brackets, rigidly affixed to the said puller frame, and substantially co-planer with the said sheave head support boom and said puller frame,
         each said support bracket comprising a face, comprising a concave surface, said concavity of said surface lying in a plane substantially perpendicular to the said longitudinal axis of the said puller frame, and,
      said support bracket so configured and located that said concavity of each said support bracket substantially bisected by a plane defined by the said plane of rotation of the said rotating sheave,
   said wire pulling machine so dimensioned that
      the greatest width of the said puller frame is smaller than the width of the sheave head and also smaller than the width of the one or more support brackets, and
      the greatest width of the said sheave head support boom is smaller than the width of the sheave head and also smaller than the width of the one or more support brackets.

2. A wire-pulling machine comprising:
   a puller frame having
      a length, having one or more intermediate points
      a width,
      a top end,
      a bottom end,
      a longitudinal axis, and
   a sheave head support boom, having
      a length, a width,
      a top end,
      a bottom end, and
      a longitudinal axis,
   said sheave head support boom bottom end rigidly affixed to the said top end of the said puller frame, such that
   the said longitudinal axis of the said sheave support boom essentially shares a plane with the longitudinal axis of the said puller frame,
   said sheave head support boom also comprised of a sheave-head, comprising,
   a sheave housing, and
   a rotating sheave over which a wire or line to be pulled may be fair-led,
   said rotating sheave mounted in the said sheave housing and having a plane of rotation,
   said sheave head rigidly mounted at the said top end of the said sheave head support boom such that the said plane of rotation of the said rotating sheave is substantially aligned with the said longitudinal axis of the said sheave head support boom,
   said puller frame also comprising
   a wire pull assembly comprised of
   drive train, comprising,
      a capstan around which a wire or line to be pulled may be wound and fair-led, said capstan having a plane of rotation, said plane of rotation being substantially parallel to or co-planer with, the said longitudinal axis of the said puller-frame, said capstan so configured that it can turn freely with wire, line, cord, cable, or rope wrapped loosely around it, not under tension, said drive train also comprising a gearbox, said gearbox in drive-train communication with said capstan, said drive train also comprising a drive interface mechanism, said drive interface mechanism being connectable to a rotary power source such that said rotary power source may drive rotation of the said gearbox and thereby drive rotation of the said capstan, said puller frame also comprised of a conduit interface comprising a conduit interface boss so configured as to be affixable to an end of a conduit, said conduit interface removably rigidly affixed to the said sheave head support boom at the said top end of the sheave head support boom, said puller frame also comprising one or more support brackets, rigidly affixed to the said puller frame, and substantially co-planer with the said sheave head support boom and said puller frame, each said support bracket comprising a face, comprising a concave surface, said concavity of said surface lying in a plane substantially perpendicular to the said longitudinal axis of the said puller frame, and, said support bracket so configured and located that said concavity of each said support bracket substantially bisected by a plane defined by the said plane of rotation of the said rotating sheave, said wire pulling machine so dimensioned that the greatest width of the said puller frame is smaller than the width of the sheave head and also smaller than the width of the one or more support brackets, and the greatest width of the said sheave head support boom is smaller than the width of the sheave head and also smaller than the width of the one or more support brackets.

\* \* \* \* \*